United States Patent [19]
Barbour

[11] 3,868,501
[45] Feb. 25, 1975

[54] LIGHT BOXES WITH FRESNEL LENSES
[75] Inventor: Roberto Barbour, Roslyn Harbor, N.Y.
[73] Assignee: Cryton Optics, Inc., Roslyn, N.Y.
[22] Filed: May 16, 1973
[21] Appl. No.: 360,688

[52] U.S. Cl............ 240/10.1, 240/10 R, 240/106.1
[51] Int. Cl............................................... F21p 5/04
[58] Field of Search....... 240/10 R, 10.1, 93, 106 R, 240/106.1; 350/127; 84/464

[56] References Cited
UNITED STATES PATENTS

| | | | |
|---|---|---|---|
| 2,386,075 | 10/1945 | Tanaka | 350/127 |
| 2,455,020 | 11/1948 | McQuaid | 240/10.1 |
| 2,596,049 | 5/1952 | Siezen | 350/127 |
| 2,959,094 | 11/1960 | Kosma | 240/10 R |
| 3,020,395 | 2/1962 | Peltz | 240/106 R |
| 3,366,786 | 1/1968 | Delano | 240/10 R |
| 3,611,603 | 10/1971 | Gesner | 240/10 R |
| 3,666,936 | 5/1972 | Webster, Jr. et al. | 240/10 R |
| 3,809,879 | 5/1974 | Gonzalez | 240/10 R |

Primary Examiner—Samuel S. Matthews
Assistant Examiner—Russell E. Adams, Jr.

[57] ABSTRACT

A light box for producing highly complex and decorative multi-color patterns which are brilliantly illuminated. The light box includes an enclosure whose front panel is defined by a transparent Fresnel lens functioning as a screen. Mounted within the enclosure is a light source, preferably in the form of an array of light bulbs of different colors, some bulbs operating intermittently and at random. Light rays from the source are directed onto the rear of the screen through optical elements which modify or disperse the rays, the Fresnel lens functioning to condense the rays and to magnify the light pattern displayed on the front of the screen.

3 Claims, 11 Drawing Figures

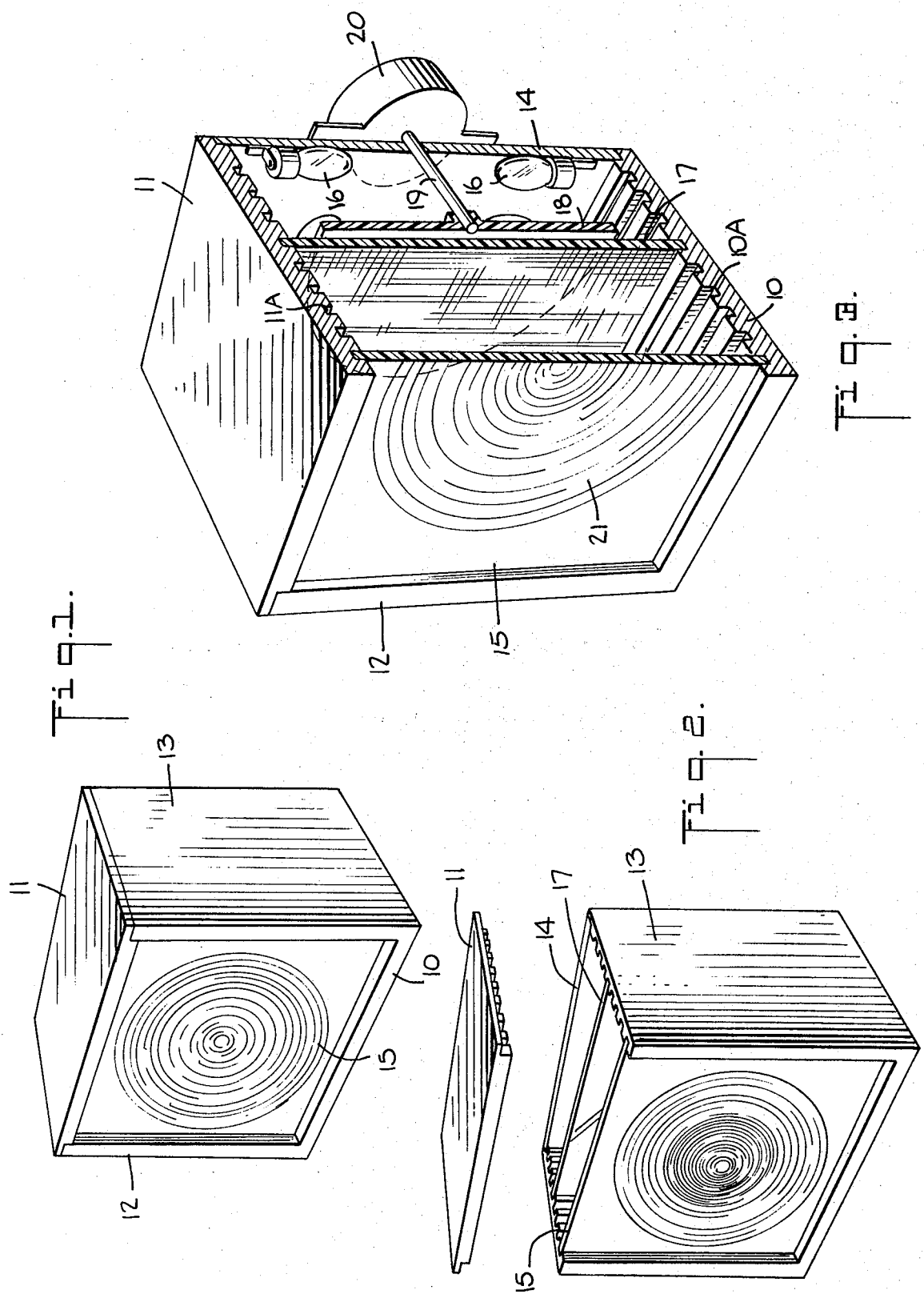

PATENTED FEB 25 1975 3,868,501

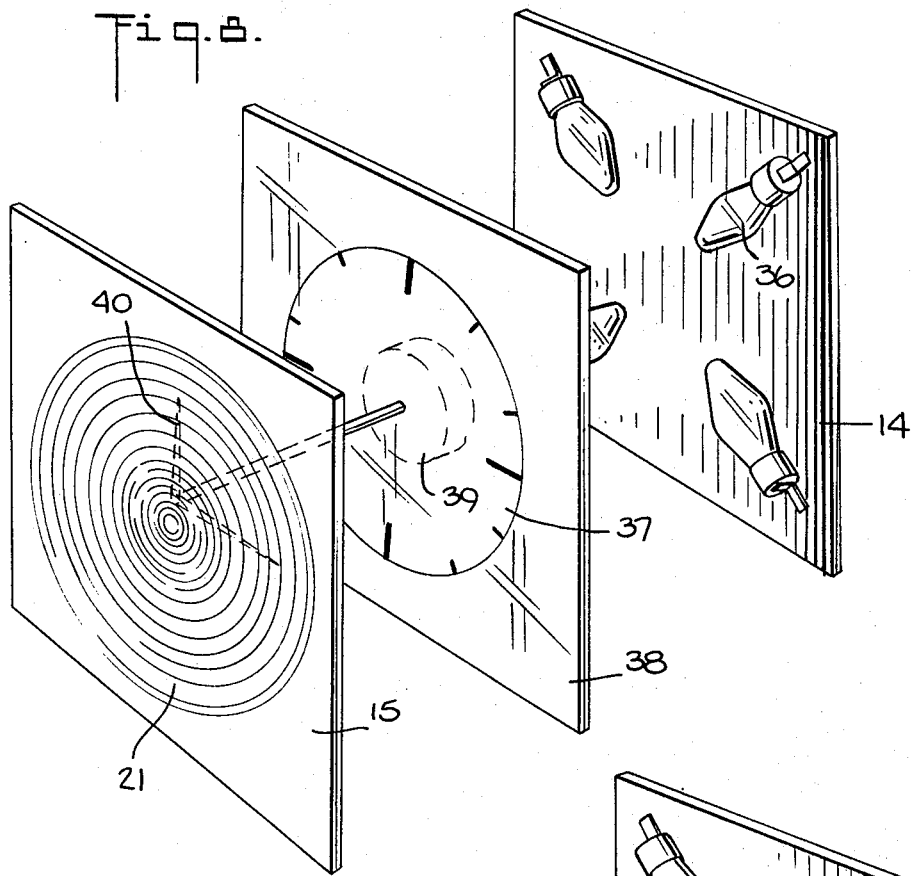

LIGHT BOXES WITH FRESNEL LENSES

BACKGROUND OF THE INVENTION

This invention relates generally to light boxes for producing multi-colored light patterns, and more particularly to light boxes in which modified and dispersed light rays are projected onto Fresnel lenses to produce variegated decorative effects.

The primary function of a light source such as an electric lamp fixture is utilitarian, for it serves to produce light for illumination purposes. The term light box as used herein refers to an enclosure containing a light source and light modifying and dispersing elements to create multi-colored light patterns whose function is essentially aesthetic or decorative. To give a simple analogy, the purpose of a common water tap is to provide a source of drinking water as distinguished from a fountain wherein water streams are projected and dispersed to create a fluidic display pattern.

Because of the current interest in so-called psychodelic experiences in which the sensory effects of light and sound patterns are exploited to heighten consciousness, various forms of light boxes have been developed to generate multi-colored light patterns. These light boxes generally take the form of an enclosed light source operating in conjunction with color-wheels, rotating prisms and other light dispersing and modifying elements to convert the light from the source into a multi-colored pattern which is cast on the rear of a translucent viewing screen, whereby the resultant pattern is viewable on the front face of the screen.

In light boxes of the type heretofore known, the only function of the translucent screen is to provide a display surface for the patterns produced by the light modifying and dispersing elements, for the screen itself does not alter or magnify this pattern or play any role in creating decorative multi-color effects.

SUMMARY OF THE INVENTION

In view of the foregoing, it is the main object of this invention to provide a light box capable of producing highly complex, decorative, multi-color light patterns which are brilliantly illuminated.

More particularly, it is an object of this invention to provide a light box of the above-noted type in which the patterns are created by means of a light source disposed within an enclosure whose front panel takes the form of a Fresnel lens functioning as a screen to exhibit the light patterns.

Among the significant advantages of the invention flowing from the use of a Fresnel lens screen is that the screen not only functions to display the pattern but it also serves to condense and magnify the light from the source or from the optical modifying or dispersing element interposed between the source and the screen, whereby the pattern on the screen is brilliantly illuminated. Another feature of the invention is that when slides or other image producing elements are interposed between the light source and the screen, the screen exhibits a magnified replica of the image on the screen, and in some instances, projects the image into space to create a floating image effect. Briefly stated these objects are realized in a light box whose enclosure includes a front panel defined by a Fresnel lens functioning as a screen. Mounted within the enclosure is a light source, preferably in the form of an array of lighted bulbs of different colors, some bulbs operating intermittently and at random.

Light rays from this source are directed onto the screen through optical elements which modify or disperse the rays, the Fresnel lens acting to condense the rays and to magnify the light pattern displayed on the front of the screen, whereby the exhibited pattern is brilliantly illuminated.

OUTLINE OF DRAWINGS

For a better understanding of the invention, as well as further objects and features thereof, reference is made to the following detailed description of the invention to be read in conjunction with the accompanying drawings wherein:

FIG. 1 is a perspective view of one preferred embodiment of the light box in accordance with the invention;

FIG. 2 shows the same light box with its cover raised;

FIG. 3 is a transverse section taken through this light box to expose the light source and the light-modifying components thereof;

FIG. 8 is a perspective view of a fifth preferred embodiment of a light box in accordance with the invention, the box itself being omitted;

FIG. 9 is a perspective view of a sixth preferred embodiment of a light box in accordance with the invention, the box itself being omitted;

DESCRIPTION OF INVENTION

Figure 4:
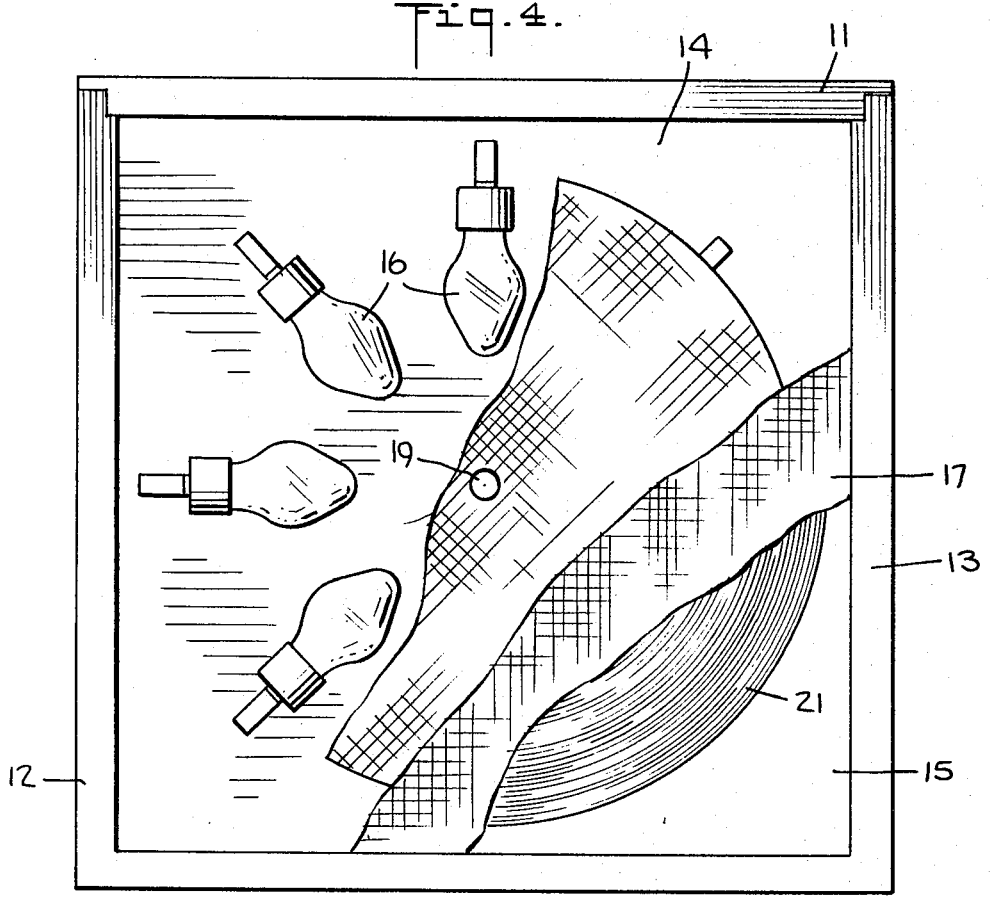
FIG. 4 is a front view of the light box, with the elements cut away to expose the interior of the box.

Referring now to the drawings and more particularly to FIGS. 1 to 4 showing one preferred embodiment of the invention, it will be seen that the light box is provided with an enclosure including a rectangular base 10, a removable cover 11 and side walls 12 & 13. The enclosure is completed by a rear panel 14 and a front panel 15. All components of the enclosure are opaque save for the front panel which is translucent. In practice, the opaque components may be fabricated of wood, plastic or metal.

The interior surfaces of the base, the cover and the side walls are formed with complementary rows of equi-spaced parallel channels or grooves having a rectangular cross section. Thus base 10 is provided with a row of grooves 10A, cover 11 with a row of grooves 11A, side wall 12 with a row of grooves 12A and side wall 13 with a row of grooves 13A.

The front panel 15 and rear panel 14 are dimensioned to be received within a selected set of complementary grooves in the base, the cover and the side walls. These panels may be positioned to fit into the end grooves in the row or in intermediate grooves therein, so that the relative positions of these panels may be changed, as desired.

Mounted on the rear panel 14 is a circular array of electric light bulbs 16, the bulbs being screwed into sockets oriented along radial lines. In practice, these bulbs are of the Christmas tree type and are in different colors, including white. Some of the bulbs incorporate blinker or interrupter devices in their sockets so they turn on and off intermittently. The other bulbs are non-blinkers so that they remain on at all times. This array of bulbs constitutes the light source of the box, the light rays emitted therefrom being in diverse colors and being generated intermittently in a random manner, for each blinker bulb goes on and off without regard to the action of the other bulbs.

Disposed within the enclosure at a selected point between rear panel 14 and front panel 15 is an intermediate panel 17 which is dimensioned to be received in a set of complementary grooves. Intermediate panel 17 is formed of a transparent plastic material, such as polyvinyl chloride (PVC) or acrylic. Intermediate panel 17 is inscribed with linear grooves in a rectangular grid formation which serves to produce optical interference as a result of diffraction effect, thereby dispersing the light passing through the panel.

A rotating disc 18 of transparent material similar or identical to that of intermediate panel 17, is supported on the end of a shaft 19 extending from a motor 20 mounted behind rear panel 14, the disc 18 being disposed adjacent the rear face of intermediate panel 17. Disc 18 is inscribed with grooves in a rectangular grid formation similar to that formed on intermediate panel 17, but since the disc rotates, the angular relationship between the two grid formations undergoes continuous change, as a result of which the optical interference pattern produced by the two grid formations is continuously varied.

Thus we have a light source which emits light rays of different color, some of whose rays are intermittently generated at random, the rays passing through the two rectangular grids whose optical relationship is continuously changing. As a consequence, the light beams emerging from the light bulbs 16 are dispersed and modified by the two grids to generate everchanging multi-colored light patterns which are both complex and unpredictable.

This light pattern is directed toward the translucent front panel 15 whose surface is molded or otherwise treated to constitute a Fresnel lens 21. A Fresnel lens is one that has a surface consisting of a concentric series of simple lens sections so that a thin lens with a short focal length and large diameter is made possible. Thus, by means of a series of precisely spaced prismatic grooves, each at a different angle and at a different depth, one may produce a flat surface lens with the optical characteristic of a curved lens surface. Fresnel lenses can be made in both positive and negative powers. One can also make lenticular Fresnel lenses or Fresnel lens arrays of different focal lengths, in different sizes and thicknesses.

A Fresnel lens front panel screen in the context of a light box carries out functions which cannot be achieved with optically equivalent convex or concave lenses. Moreover, even if these functions could be achieved with ordinary lenses, the equivalent lenses would be relatively large, thick and heavy. In the present arrangement, the Fresnel lens screen also acts as a condenser so that the light pattern which is magnified thereby is distributed across the entire surface thereof to provide brilliantly illuminated decorative patterns.

To operate the light box shown in FIGS. 1 and 4, one has merely to plug in the cable supplying current to both the motor and light bulbs. Because the front, rear and intermediate panels may be placed at various positions relative to each other, one can alter the light pattern produced by the box.

Figure 5:
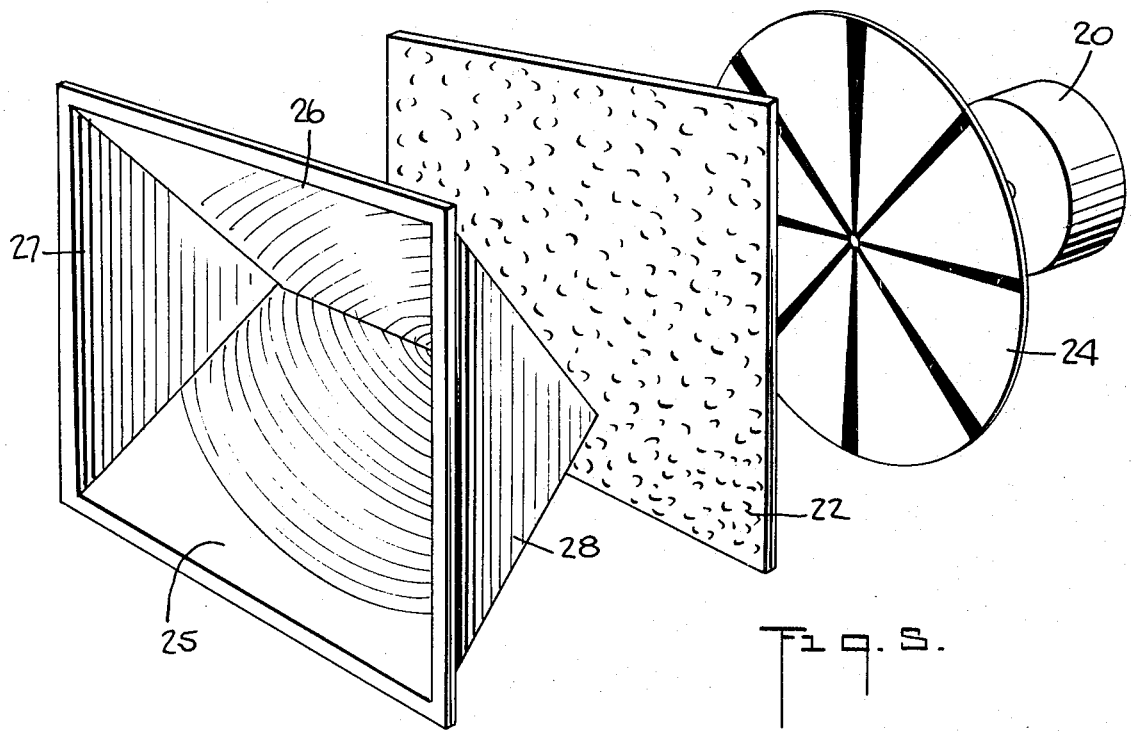
FIG. 5 is a perspective view of a second preferred embodiment of a light box in accordance with the invention, the box itself being omitted.

Referring now to FIG. 5, there is shown a second embodiment of the light box which differs from the first embodiment in the following respects: Instead of an intermediate panel having a rectangular grid formation, an intermediate panel 22 is provided which is of a transparent material whose surface has a pebble-like finish to break up and disperse the rays passing therethrough, for each functions as a miniature lens. Cooperating with intermediate panel 22 is a disc 24 which is driven by motor 20 and is provided with opaque radial spokes that serve to interrupt the light from the light source at a rate determined by the rotary speed of the disc and the number of spokes.

The screen in this instance is not composed of a single, vertically disposed Fresnel lens, as in FIG. 1, but by a pair of Fresnel lens panels 25 & 26 in a V-shape formation, the edges of the panels being joined to triangular closure plates 27 & 28. Thus, in this embodiment, a double light pattern is presented on the screen.

Figure 6:
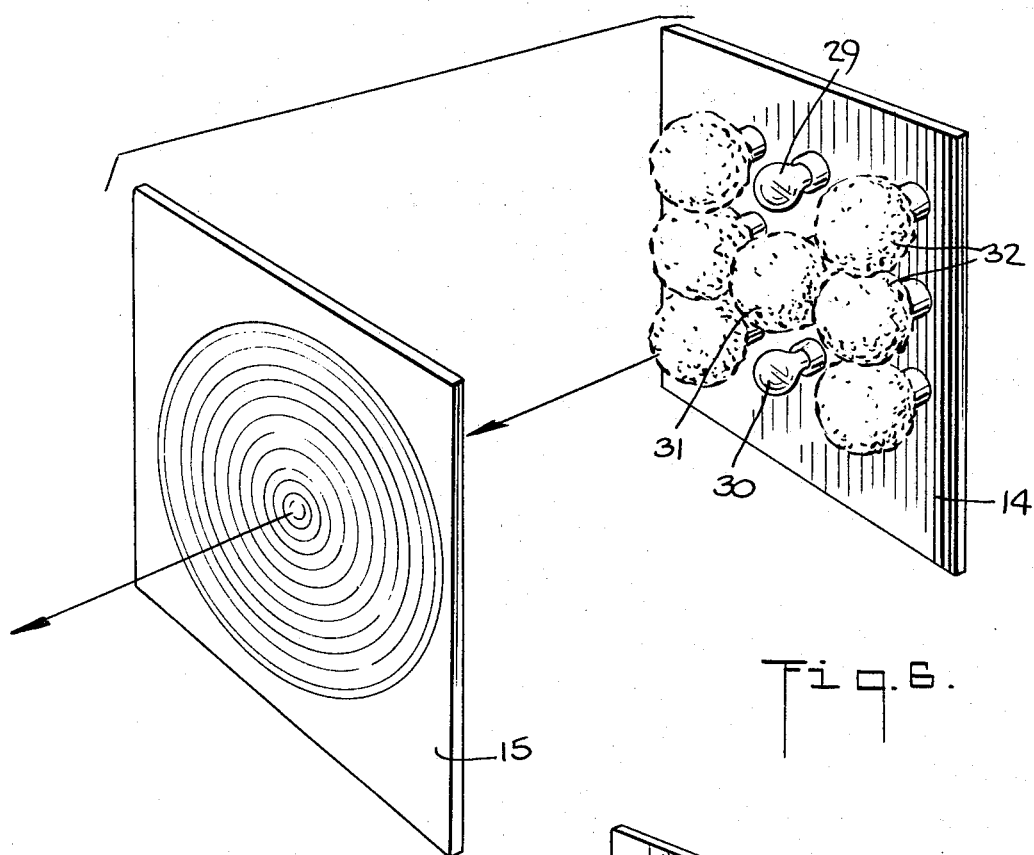
FIG. 6 is a perspective view of a third preferred embodiment of a light box in accordance with the invention, the box itself being omitted.

In FIG. 6, the light source on the rear panel, rather than being in the form of radially-arranged bulbs is composed of a rectangular array of bulbs, two of which are white bulbs 29 and 30 above and below a center bulb 31, the array being completed by bulb 32. Bulbs 31 & 32 are colored blinker lights, whereas the white bulbs do not blink.

Figure 7:
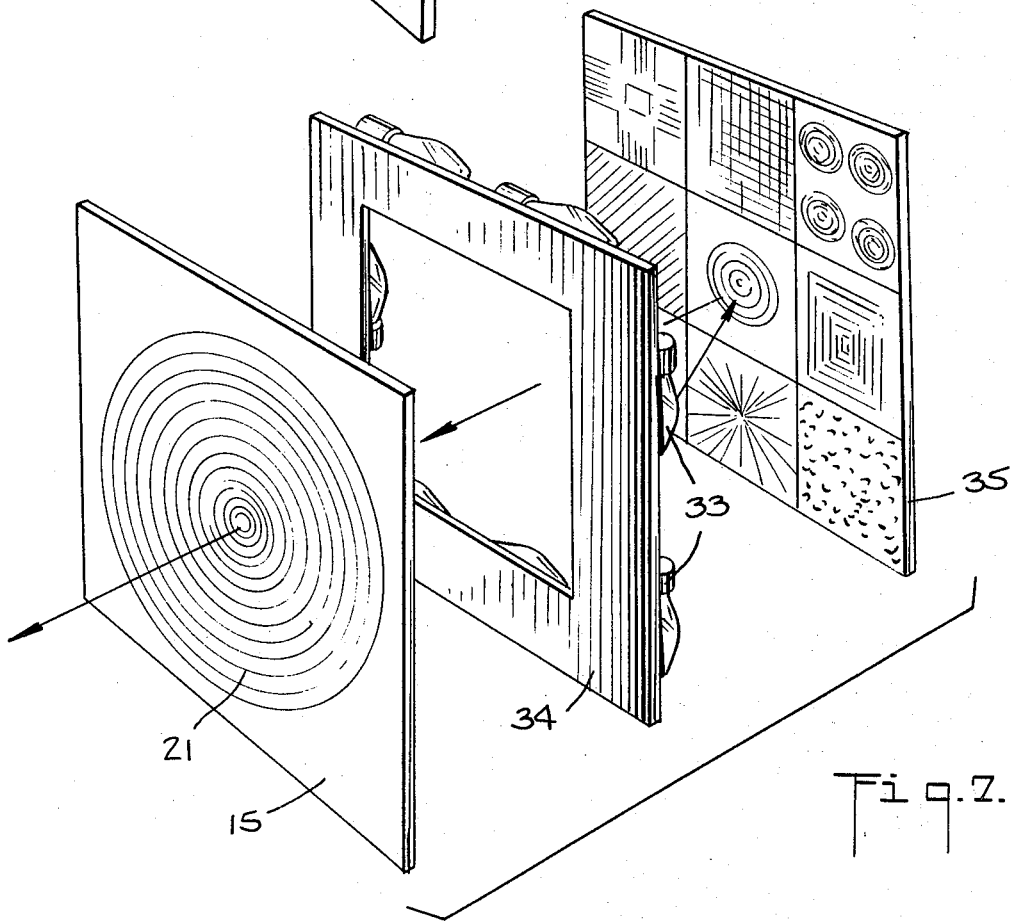
FIG. 7 is a perspective view of a fourth preferred embodiment of a light box in accordance with the invention, the box itself being omitted.

In FIG. 7, the light source is in the form of bulbs 33 mounted along the rear border of a rectangular frame 34 which functions as the intermediate panel in the light box. The rear panel 35 is provided with a reflective aluminum foil sheet which is embossed or otherwise treated to create nine decorative squares in different patterns. These squares reflect the blinking color rays from the light source, the reflected rays therefrom being directed toward the front panel Fresnel lens 15.

In FIG. 8, an array of light bulbs are mounted on the rear panel 14 of the light box and these serve to illuminate the indicia on a translucent clock dial 37 mounted centrally on the intermediate plate 38. Supported on the dial is a clock motor 39 whose shaft is extended and terminates in clock hands 40 adjacent the rear of the front panel provided with Fresnel lens 21. Thus, the image of the clock dial is projected onto the front panel screen which is illuminated in changing colors by reason of the blinker lights.

In the arrangement shown in FIG. 9, the rear panel 14 is provided at its center with a large white bulb 41 which serves to illuminate a design 42 imprinted on a transparent intermediate panel 43. The nature of the Fresnel lens 21 on front panel 15 and its position relative to the intermediate panel is such as to cause an apparent image of the design to float in advance of the front panel rather than on the surface thereof. At the same time the blinker lights 44 at the four corners of the rear panel 14 produce colored light effects on the screen behind the floating design.

Figure 10:
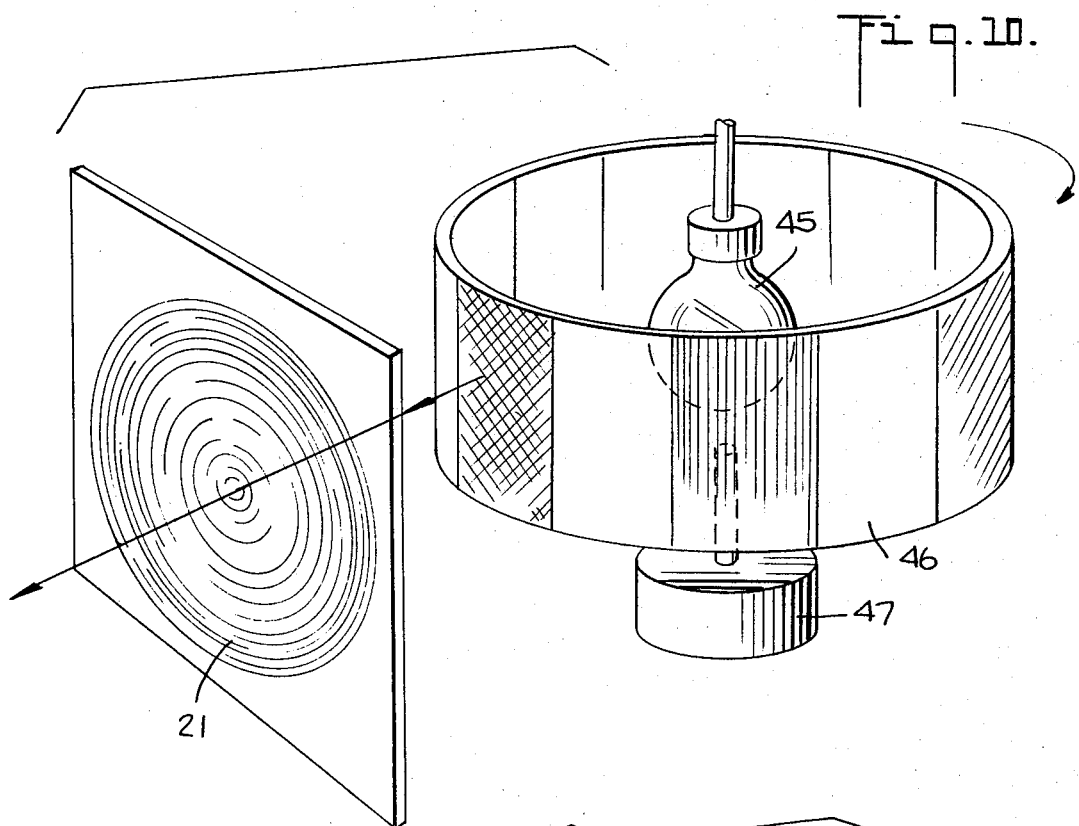
FIG. 10 is a perspective view of a seventh preferred embodiment of a light box in accordance with the invention, the box itself being omitted.

In FIG. 10, the light bulb 45 is vertically mounted in registration with the axis of rotation of a transparent turret 46 driven by a motor 47. Slides containing various decorative patterns are mounted circumferentially along the turret, so that as the turret rotates, the images of these slides are presented on the Fresnel lens screen 21.

Figure 11:
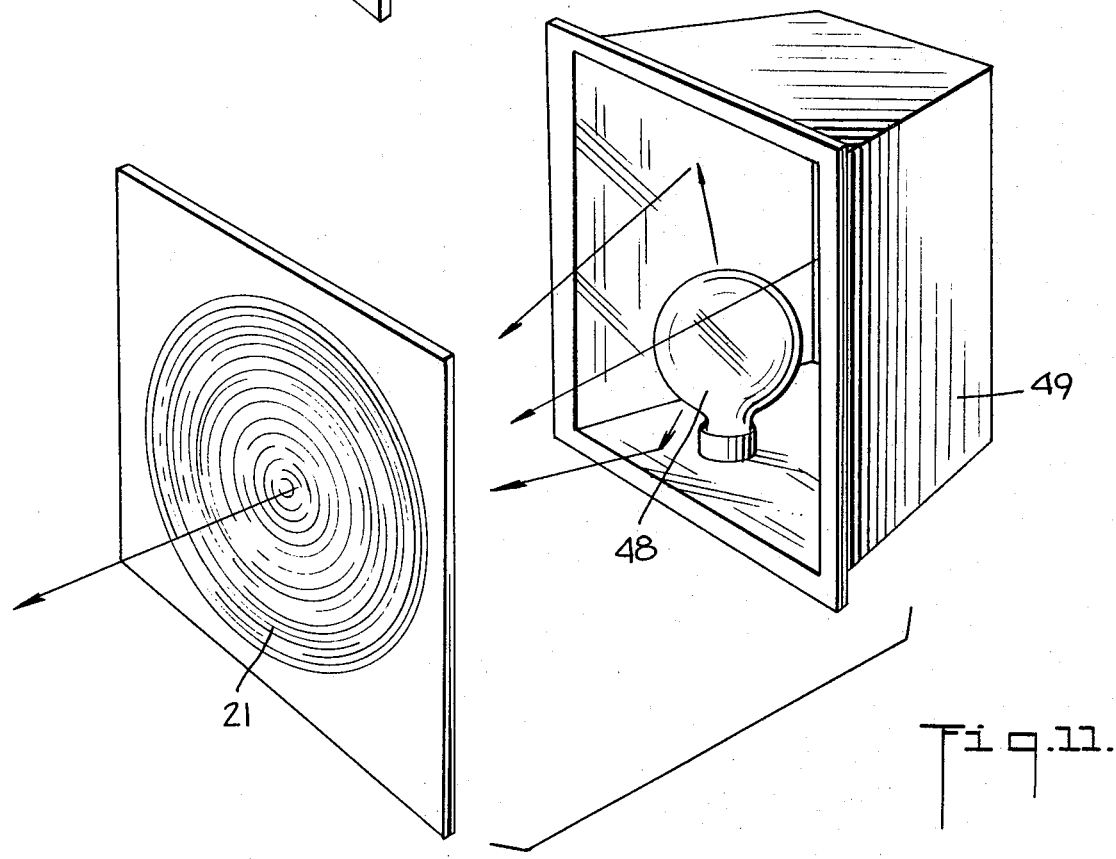
FIG. 11 is a perspective view of an eighth preferred embodiment of a light box in accordance with the invention, the box itself being omitted.

In FIG. 11, the light bulb 48 is placed within a corner reflector 49 all of whose interior walls are mirrors, the light therefrom being directed toward Fresnel lens 21 through an intermediate panel (not shown) which modifies and disperses the light rays.

While there have been shown and described preferred embodiments of Light Boxes with Fresnel Lenses, it will be appreciated that many changes and modifications may be made therein without, however, departing from the essential spirit thereof.

For example, in the arrangement shown in FIG. 10, the light source is in the center and projects rays omnidirectionally. But only one Fresnel lens front panel is shown. However, in practice, the rear and side panels of the enclosure may also be Fresnel lenses, so that four patterns from the slides may be concurrently projected. Multiple Fresnel lens arrangements of a similar kind may be used with the other embodiments disclosed herein.

What I claim is:

1. A light box adapted to produce continuously changing decorative patterns on a viewing screen, said box comprising:

A. An enclosure having a front panel fabricated of clear plastic material having a series of concentric prismatic grooves formed on one face thereof to define a Fresnel lens serving as a viewing screen;
    B. A light source disposed within said enclosure to produce rays directed toward said front panel, and;
    C. a light modifying element interposed between said source and said screen, said Fresnel lens screen functioning to condense and magnify the modified light rays passing through said element whereby the resultant pattern presented on the screen and directly viewable thereon represents the interaction of said light modifying element and said lens and is brilliantly illuminated, said light modifying element including a rotating disc of transparent material which is formed to disperse light passing therethrough and a panel intermediate said disc and said front panel, said intermediate panel having a pebble-like surface defining a multitude of miniature lenses to disperse light.

2. A light box as set forth in claim 1 wherein said enclosure is provided with a rear panel having an interior face and said light source is composed of bulbs mounted on the interior face of said rear panel.

3. A light box as set forth in claim 2, wherein said bulbs are adapted to emit light of different color and further including sockets for supporting said bulbs, some of which sockets include interrupters to effect blinking.

* * * * *